US008296049B2

United States Patent
Obuchi (10) Patent No.: US 8,296,049 B2
(45) Date of Patent: Oct. 23, 2012

(54) VEHICLE CONTROL DEVICE

(75) Inventor: Yutaka Obuchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/997,956

(22) PCT Filed: Jul. 7, 2009

(86) PCT No.: PCT/JP2009/062369
§ 371 (c)(1),
(2), (4) Date: Dec. 14, 2010

(87) PCT Pub. No.: WO2011/004458
PCT Pub. Date: Jan. 13, 2011

(65) Prior Publication Data
US 2012/0136563 A1    May 31, 2012

(51) Int. Cl.
*G06F 17/10* (2006.01)
(52) U.S. Cl. ........... 701/124; 701/30.2; 701/36; 701/37; 701/70; 702/166; 702/169; 294/81.3; 703/22
(58) Field of Classification Search ............... 701/124
See application file for complete search history.

(56) References Cited

U.S. PATENT DOCUMENTS
2009/0009718 A1    1/2009    Legatt

FOREIGN PATENT DOCUMENTS

| JP | A-2000-292316 | 10/2000 |
| JP | 2002012141 A * | 1/2002 |
| JP | A-2004-203084 | 7/2004 |
| JP | A-2006-76403 | 3/2006 |
| JP | 2008/522886 A | 7/2008 |

OTHER PUBLICATIONS

International Search Report issued in International Application No. PCT/JP2009/062369 on Oct. 27, 2009 (with translation).

* cited by examiner

*Primary Examiner* — Behrang Badii
*Assistant Examiner* — Navdeep Mand
(74) *Attorney, Agent, or Firm* — Oliff & Berridge, PLC (57) ABSTRACT

In a vehicle control device capable of sufficiently exhibiting the effect of vehicle control, a selection section selects a value greater than an intermediate value of a vehicle weight in a range restricted by a range restriction unit as the value of the vehicle weight and selects a value greater than an intermediate value of the height of the center of gravity in the range as the value of the height of the center of gravity. For stability, the greater the height of the center of gravity of the vehicle is, the stricter the conditions that are imposed. For fuel consumption, the greater the vehicle weight is, the stricter the conditions that are imposed. The selection section selects the values which become conditions stricter than at least an intermediate value in the range restricted by the range restriction section, and the range restriction section restricts the range.

2 Claims, 6 Drawing Sheets

VEHICLE CONTROL DEVICE

TECHNICAL FIELD

The present invention relates to a vehicle control device having a function of calculating the height of a center of gravity of a vehicle.

BACKGROUND ART

In the related art, a vehicle control device is known in which the total weight of a vehicle is calculated on the basis of a change in the vehicle speed and fuel consumption while the vehicle starts and is accelerated, the height of the center of gravity of the vehicle is estimated on the basis of the total weight of the vehicle, the variation in the rear shaft load at the time of braking, the wheel base, the unsprung mass, the pressure of the air suspension at the time of braking, and deceleration/acceleration at the time of braking, and the estimated value is reflected in vehicle control (for example, Patent Literature 1).

CITATION LIST

Patent Literature

Patent Literature 1: Japanese Unexamined Patent Application Publication No. 2000-292316

SUMMARY OF INVENTION

Technical Problem

In the above-described vehicle control device, it is not possible to estimate the total weight of the vehicle or the height of the center of gravity of the vehicle with sufficient accuracy, and there is a demand for improvement in reflecting the estimated value in control. For example, in performing control for improving the behavior stability of the vehicle, when the estimated value of the height of the center of gravity of the vehicle is calculated to be smaller than the actual value, or when the estimated value of the total weight of the vehicle in predicting fuel consumption is calculated to be smaller than the actual value, there is the possibility that the effect of control becomes insufficient.

The invention has been finalized in order to solve such problems, and an object of the invention is to provide a vehicle control device capable of improving the behavior stability of a vehicle and sufficiently exhibiting the effect of vehicle control.

Solution to Problem

A vehicle control device according to the invention includes an arithmetic unit which calculates a curve representing a product of a vehicle weight and a height of a center of gravity of a vehicle on the basis of behavior of the vehicle, a range restriction unit which superimposes the curve on a line representing a relationship between the vehicle weight and the height of the center of gravity set in advance for the vehicle to restrict the range of the vehicle weight and the height of the center of gravity, and a selection unit which selects the value of the vehicle weight and the value of the height of the center of gravity from the range restricted by the range restriction unit. The selection unit selects a value greater than an intermediate value of the vehicle weight in the range as the value of the vehicle weight and selects a value greater than an intermediate value of the height of the center of gravity in the range as the value of the height of the center of gravity.

With the vehicle control device according to the invention, the selection unit can select a value greater than an intermediate value of the vehicle weight in the range restricted by the range restriction unit as the value of the vehicle weight and can select a value greater than an intermediate value of the height of the center of gravity in the range as the value of the height of the center of gravity. For example, in performing control to improve the behavior stability of the vehicle, the greater the height of the center of gravity of the vehicle is, the stricter the conditions that are imposed. In performing control to predict fuel consumption, the greater the vehicle weight is, the stricter the conditions that are imposed. Thus, the selection unit selects values which become conditions stricter than at least intermediate values in the range restricted by the range restriction unit, improving reliability of vehicle control. As described above, if the range is restricted by the range restriction unit, while the values approximating the actual vehicle weight and the height of the center of gravity are estimated, the values which become the strict conditions in vehicle control are selected, making it possible to improve the behavior stability of the vehicle and to sufficiently exhibit the effect of vehicle control.

In the vehicle control device according to the invention, the selection unit may select the value of the vehicle weight at a boundary position of the range as the value of the vehicle weight and may select the value of the height of the center of gravity at a boundary position of the range as the value of the height of the center of gravity. The selection unit can select the value of the vehicle weight at the boundary position of the range, that is, the maximum value of the vehicle weight in the restricted range, and can select the value of the height of the center of gravity at the boundary position of the range, that is, the maximum value of the height of the center of gravity in the restricted range. Thus, the selection unit can select the values which become the strictest conditions in vehicle control, further improving the certainty of vehicle control.

Advantageous Effects of Invention

According to the invention, it is possible to improve the behavior stability of the vehicle and to sufficiently exhibit the effect of vehicle control.

DESCRIPTION OF EMBODIMENTS

Hereinafter, an embodiment appropriate to a vehicle control device according to the invention will be described in detail with reference to the drawings.

Figure 1:
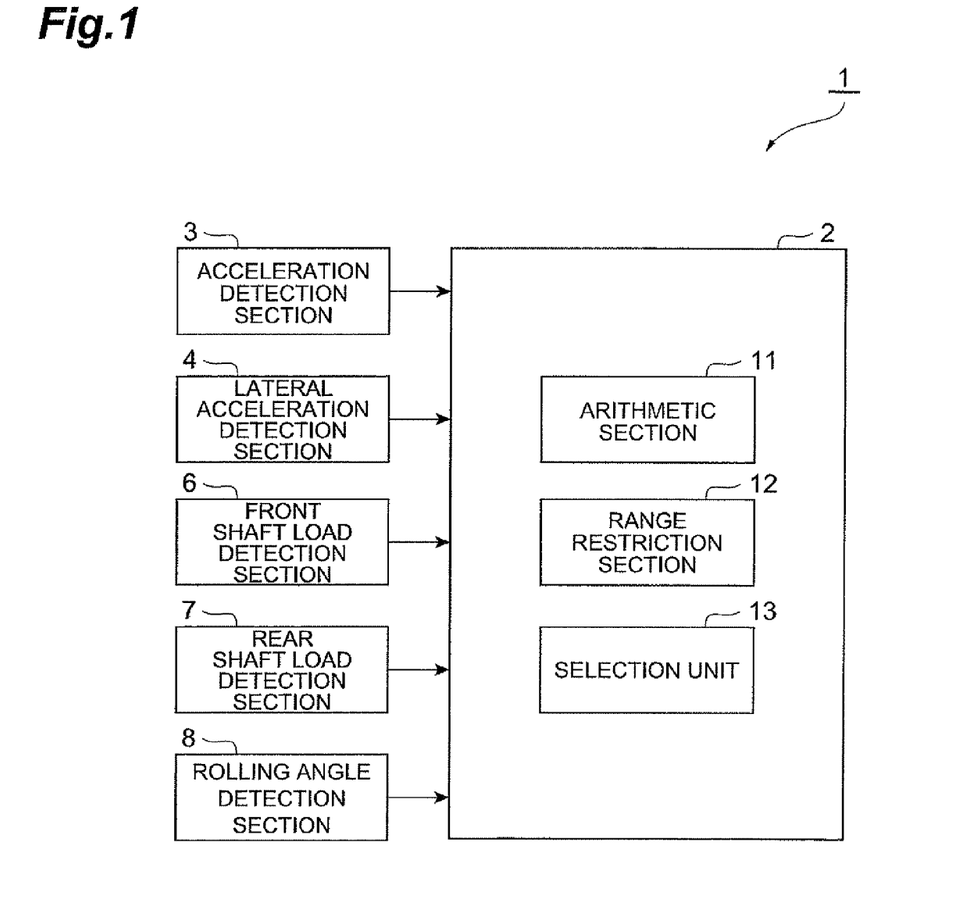
FIG. 1 is a diagram showing the block configuration of a vehicle control device according to an embodiment of the invention.

FIG. 1 is a diagram showing the block configuration of a vehicle control device 1 according to the embodiment of the invention. The vehicle control device 1 has a function of estimating the vehicle weight and the height of the center of gravity of the vehicle and using the estimated values for vehicle control processing. The vehicle control device 1 includes an ECU (Electronic Control Unit) 2, an acceleration detection section 3, a lateral acceleration detection section 4, a front shaft load detection section 6, a rear shaft load detection section 7, and a rolling angle detection section 8.

The acceleration detection section 3 has a function of detecting the forward and backward acceleration of a vehicle and is constituted by, for example, an acceleration sensor for use in an Antilock Breaking System ("ABS") or Vehicle Stability Control ("VSC"). Alternatively, the acceleration detection section 3 may detect forward and backward acceleration on the basis of the wheel speed. The acceleration detection section 3 has a function of outputting the detected forward and backward acceleration of the vehicle to the ECU 2. The lateral acceleration detection section 4 has a function of detecting lateral acceleration of the vehicle and is constituted by a lateral acceleration sensor. The lateral acceleration detection section 4 has a function of outputting the detected lateral acceleration to the ECU 2.

The front shaft load detection section 6 has a function of detecting a load $F_f$ imposed on a front shaft FS of a vehicle M1 (see FIGS. 3 and 5) and is constituted by a pressure sensor or the like provided in the front shaft FS. The rear shaft load detection section 7 has a function of detecting a load $F_r$ imposed on a rear shaft RS of the vehicle M1 (see FIGS. 3 and 5) and is constituted by a pressure sensor or the like provided in the rear shaft RS. The front shaft load detection section 6 and the rear shaft load detection section 7 has a function of outputting the detected loads to the ECU 2.

The rolling angle detection section 8 has a function of detecting a rolling angle $\phi$ of the vehicle M1 and is constituted by a rolling angle sensor. The rolling angle detection section 8 may be shared with a sensor of a curtain airbag. The rolling angle detection section 8 has a function of outputting the detected rolling angle to the ECU 2.

The ECU 2 is an electronic control unit which performs overall control of the vehicle control device 1, is constituted by, for example, a CPU as a main component, and further includes a ROM, a RAM, an input signal circuit, an output signal circuit, a power supply circuit, and the like. The ECU 2 includes an arithmetic section (arithmetic unit) 11, a range restriction section (range restriction unit) 12, and a selection section (selection unit) 13.

The arithmetic section 11 has a function of calculating a curve representing the product of the vehicle weight and the height of the center of gravity of the vehicle on the basis of the behavior of the vehicle. Specifically, when the vehicle is traveling on a flat road or a slope, the arithmetic section 11 has a function of calculating the product of the vehicle weight and the height of the center of gravity on the basis of the moment balance around the front wheel or rear wheel of the vehicle. When the vehicle turns at a predetermined lateral acceleration, the arithmetic section 11 has a function of calculating the product of the vehicle weight and the height of the center of gravity on the basis of the rolling moment balance or gravitational moment balance.

The range restriction section 12 has a function of superimposing a line, which represents the relationship between the vehicle weight and the height of the center of gravity and is set in advance on the basis of the specification of the vehicle, on a curve calculated by the arithmetic section 11 to restrict the range of the vehicle weight and the height of the center of gravity. The details of a method of restricting the range in the range restriction section 12 will be described below.

The selection section 13 has a function of selecting the value of the vehicle weight and the value of the height of the center of gravity from the range restricted by the range restriction section 12. The selection section 13 has a function of selecting a value greater than an intermediate value of the vehicle weight in the range restricted by the range restriction section 12 as the value of the vehicle weight and selecting a value greater than an intermediate value of the height of the center of gravity in the range restricted by the range restriction section 12 as the value of the height of the center of gravity. The selection section 13 selects the value of the vehicle weight at a boundary position of the range restricted by the range restriction section 12 as the value of the vehicle weight and selecting the value of the height of the center of gravity at a boundary position of the range restricted by the range restriction section 12 as the value of the height of the center of gravity.

Figure 2:
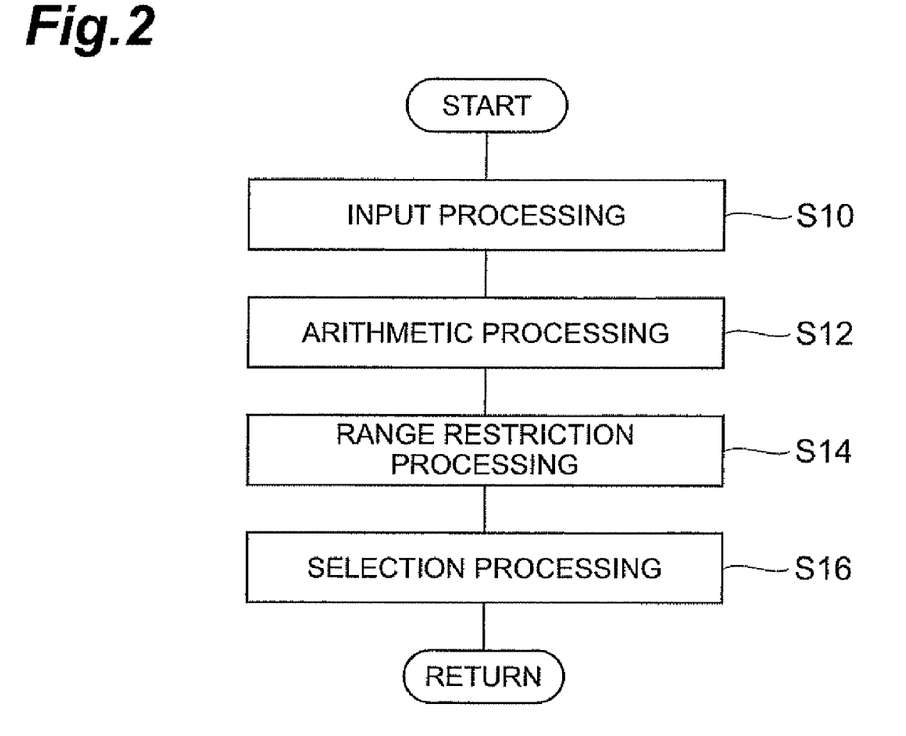
FIG. 2 is a flowchart showing control processing in the vehicle control device according to the embodiment of the invention.
Figure 3:
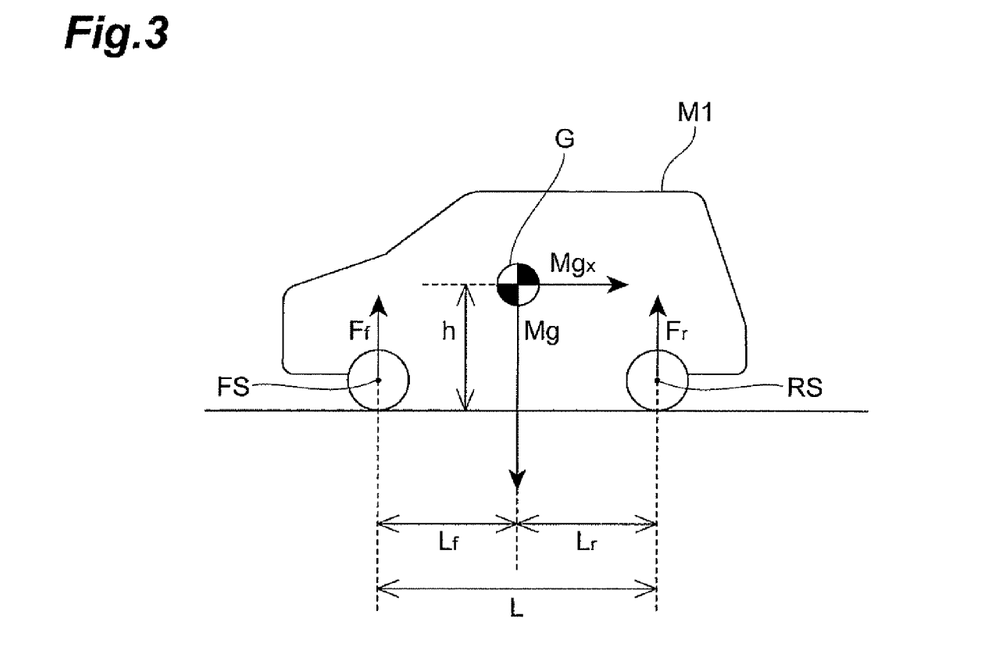
FIG. 3 is a diagram when a vehicle is viewed laterally and is a diagram showing acceleration or load applied to a vehicle.
Figure 4:
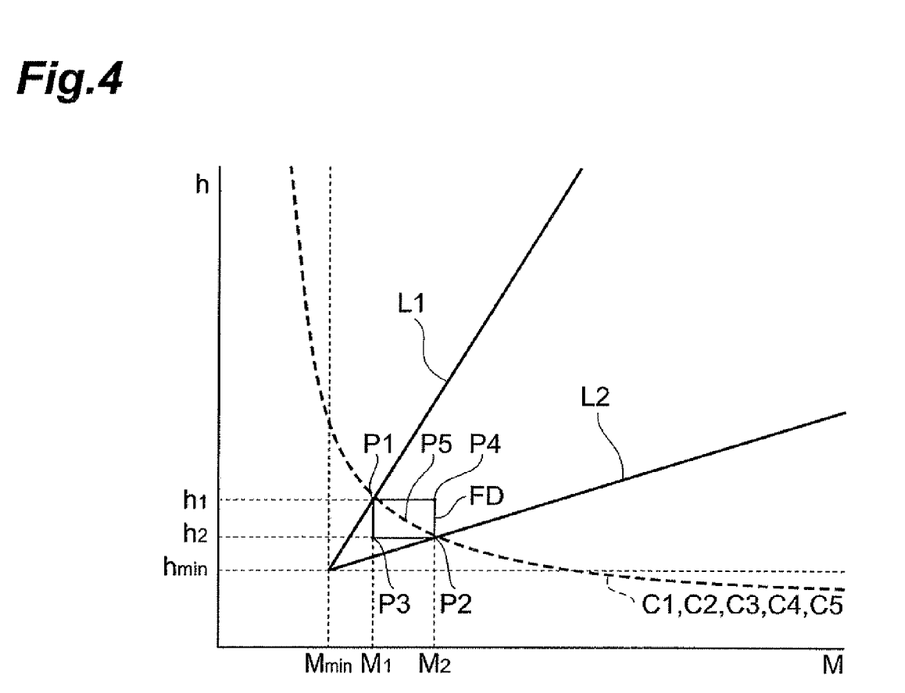
FIG. 4 is a graph for use in restricting the range of the vehicle weight and the height of the center of gravity of the vehicle.
Figure 5:
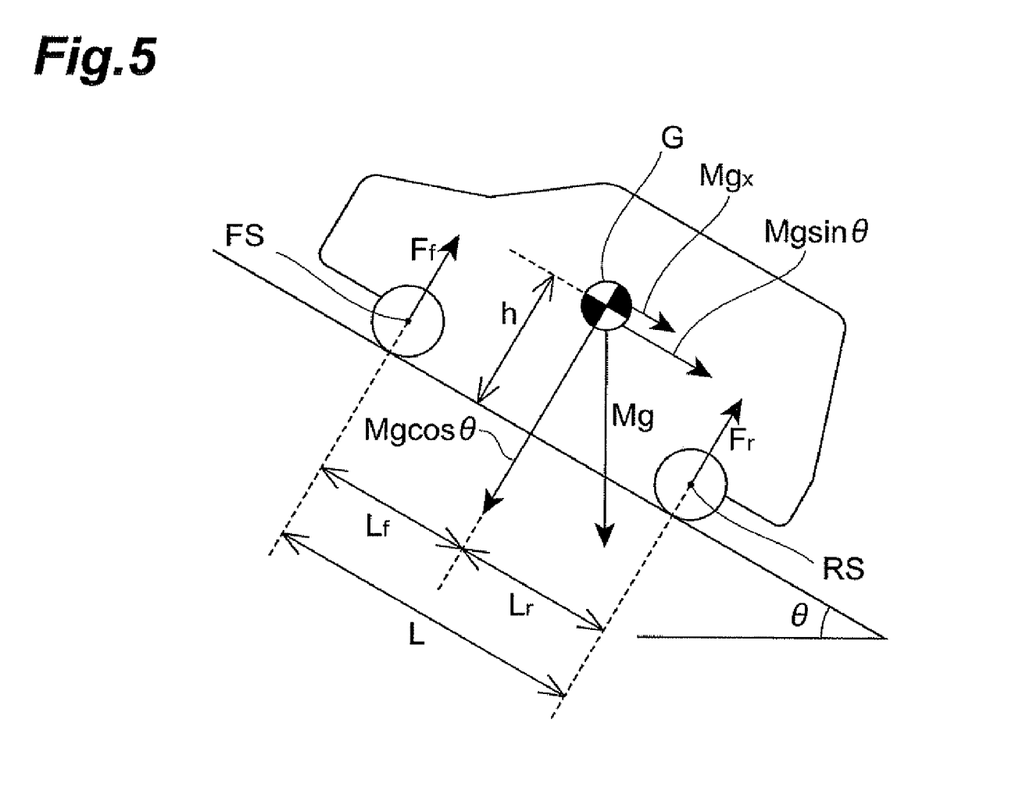
FIG. 5 is a diagram when a vehicle is viewed laterally and is a diagram showing acceleration or load applied to a vehicle which is traveling on a slope.
Figure 6:
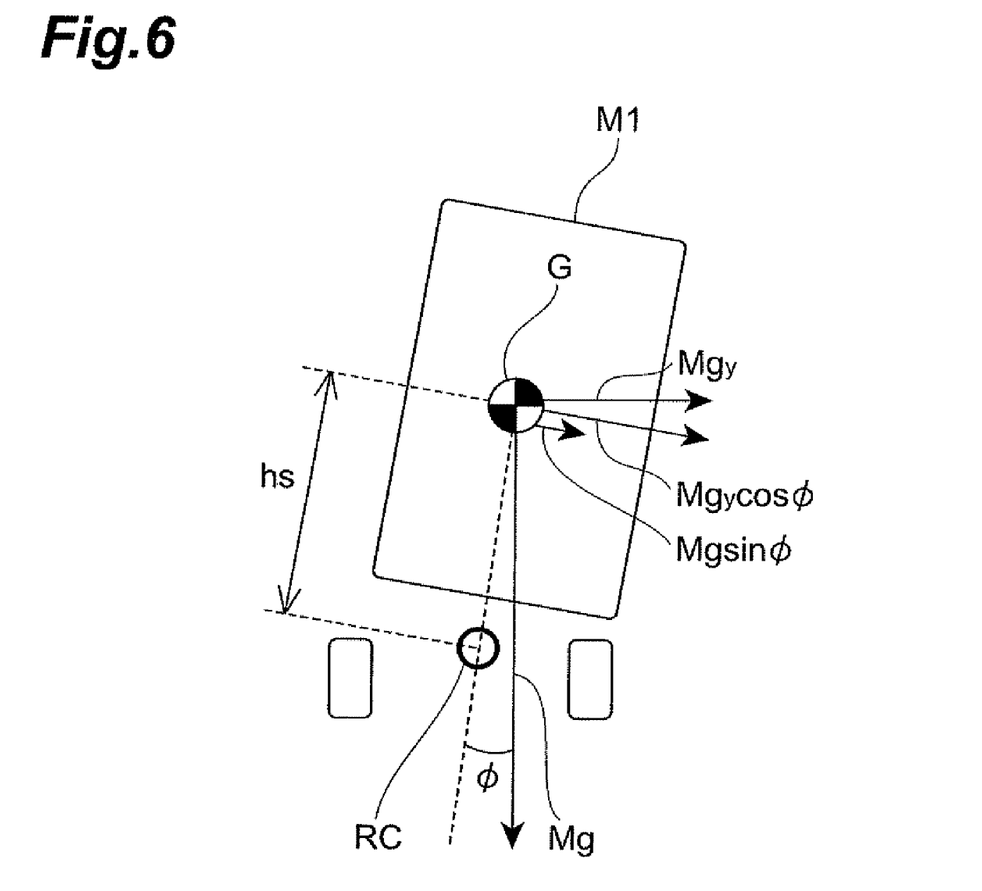
FIG. 6 is a diagram when a vehicle which is turning is viewed from the front and is a diagram showing acceleration applied to the vehicle.

Next, the operation of the vehicle control device 1 according to the embodiment of the invention will be described with reference to FIGS. 2 to 6. FIG. 2 is a flowchart showing control processing in the vehicle control device 1 of this embodiment. FIG. 3 is a diagram when the vehicle M1 is viewed laterally and is a diagram showing acceleration or load applied to the vehicle M1. FIG. 4 is a graph for use in restricting the range of the vehicle weight and the height of the center of gravity of the vehicle M1. FIG. 5 is a diagram when the vehicle M1 is viewed laterally and is a diagram showing acceleration or load applied to the vehicle M1 which is traveling on a slope. FIG. 6 is a diagram when the vehicle M1 which is turning is viewed from the front side and is a diagram showing acceleration applied to the vehicle M1.

First, with reference to FIGS. 2, 3, and 4, description will be provided as to control processing in a case where the moment balance around the front wheel is calculated to estimate the vehicle weight and the height of the center of gravity of the vehicle M1 during traveling on a flat road. In FIG. 3, M represents the vehicle weight of the vehicle M1, h represents the height of the center G of gravity of the vehicle M1 based on the ground, L represents the wheel base of the vehicle M1, $L_f$ represents the distance between the front shaft FS of the vehicle M1 and the center G of gravity in a horizontal direction, and $L_r$ represents the distance between the rear shaft RS of the vehicle M1 to the center G of gravity in the horizontal direction. $F_f$ represents a load imposed on the front shaft FS, $F_r$ represents a load imposed on the rear shaft RS, $g_x$ represents forward and backward acceleration, and g represents gravity acceleration.

First, the arithmetic section 11 receives respective values from the acceleration detection section 3, the lateral acceleration detection section 4, the front shaft load detection section 6, the rear shaft load detection section 7, and the rolling angle detection section 8 (Step S10). In the processing of S10, forward and backward acceleration $g_x$, a front shaft load $F_f$, a rear shaft load $F_r$, lateral acceleration $g_y$ are input, and forward and backward acceleration $g_x'$, a front shaft load $F_f'$, a rear shaft load $F_r'$, and a lateral acceleration $g_y'$ after a predetermined time has elapsed are also sequentially input. Next, the arithmetic section 11 calculates an expression representing the product (M·h) of the vehicle weight M and the height h of the center of gravity on the basis of the expression of the moment balance around the front wheel (Step S12). Specifically, the arithmetic section 11 acquires Expression (1) of the moment balance around the front wheel. When the forward and backward acceleration is changed to $g_x{}'$ and the rear shaft load becomes $F_r{}'$, similarly to Expression (1), the arithmetic section 11 acquires Expression (2) of the moment balance. Next, the arithmetic section 11 subtracts Expression (2) from Expression (1) to obtain Expression (3). The arithmetic section 11 modifies Expression (3) to obtain Expression (4) representing the product (M·h) of the vehicle weight M and the height h of the center of gravity. Thus, as shown in FIG. 4, a curve C1 is obtained which represents the product of the vehicle weight M and the height h of the center of gravity.

$$F_r \cdot L = M \cdot g \cdot L_f + M \cdot g_x \cdot h \qquad \text{Expression (1)}$$

$$F_r{}' \cdot L = M \cdot g \cdot L_f + M \cdot g_x{}' \cdot h \qquad \text{Expression (2)}$$

$$(F_r - F_r{}')L = M \cdot h(g_x - g_x{}') \qquad \text{Expression (3)}$$

$$M \cdot h = (F_r - F_r{}')L/(g_x - g_x{}') \qquad \text{Expression (4)}$$

The range restriction section 12 restricts the range FD of the vehicle weight M and the height h of the center of gravity (Step S14). Specifically, the range restriction section 12 superimposes lines L1 and L2 on the curve C1 on a graph shown in FIG. 4 to restrict the range FD of the vehicle weight M and the height h of the center of gravity. In the graph shown in FIG. 4, the horizontal axis represents the vehicle weight M and the vertical axis represents the height h of the center of gravity. The lines L1 and L2 are set in advance on the basis of the specification of the vehicle M1 and represent the relationship between the vehicle weight M and the height h of the center of gravity. The line L1 is set in advance by plotting the putative maximum height of the center of gravity with respect to a predetermined vehicle weight M for each vehicle weight M. The line L2 is set in advance by plotting the putative minimum height of the center of gravity with respect to a predetermined vehicle weight M for each vehicle weight M. When the minimum vehicle weight is $M_{min}$ and the minimum height of the center of gravity is $h_{min}$, all the lines L1 and L2 pass through the coordinate $(M_{min}, h_{min})$, and the inclination of the L1 is set to be greater than that of the line L2.

The range restriction section 12 superimposes the lines L1 and L2 on the curve C1 acquired in S12 to acquire a vehicle weight $M_1$ and height $h_1$ of the center of gravity at an intersection P1 between the curve C1 and the line L1 and to acquire a vehicle weight $M_2$ and height $h_2$ of the center of gravity at an intersection P2 between the curve C1 and the line L2. Next, the range restriction section 12 sets a coordinate point P3 at the position of the coordinate $(M_1, h_2)$ and sets a coordinate point P4 at the position of the coordinate $(M_2, h_1)$. Thus, the range restriction section 12 restricts a rectangular region with the apexes P1 $(M_1, h_1)$, P2 $(M_2, h_2)$, P3 $(M_1, h_2)$, and P4 $(M_2, h_1)$ as the range FD of the vehicle weight M and the height h of the center of gravity.

The selection section 13 selects the value of the vehicle weight M and the value of the height h of the center of gravity from the range FD restricted in S14 (Step S16). The selection section 13 selects the respective values such that strict conditions are imposed in performing control to improve the behavior stability of the vehicle or in performing control to predict fuel consumption. In the case of control to improve the behavior stability of the vehicle, the greater the height h of the center of gravity of the vehicle is, the stricter the conditions that are imposed. In the case of control to predict fuel consumption, the greater the vehicle weight M is, the stricter the conditions that are imposed. Thus, the selection section 13 selects $M_2$, which is a value at a boundary position of the range FD, as the vehicle weight M and selects $h_1$, which is a value at a boundary position of the range FD, as the height h of the center of gravity (that is, selects a value at P4). Instead of $(M_2, h_1)$ which is the value at the boundary position, the selection section 13 may select a value greater than $(M_1 + M_2)/2$, which is an intermediate value of the vehicle weight in the range FD, as the value of the vehicle weight M and may select a value greater than $(h_1 + h_2)/2$, which is an intermediate value of the height of the center of gravity in the range FD, as the value of the height h of the center of gravity. A coordinate point P5 represented by the coordinate $((M_1 + M_2)/2, (h_1 + h_2)/2))$ is the central point of the range FD.

If the processing of S16 ends, the processing shown in FIG. 2 ends, the respective selected values are output to the respective control sections, and the processing starts again from S10.

Next, with reference to FIGS. 2, 3, and 4, description will be provided as to control processing in a case where the moment balance around the rear wheel is calculated to estimate the vehicle weight and the height of the center of gravity of the vehicle M1 during traveling on a flat road. In this control processing, input processing of S10, range restriction processing of S14, and selection processing of S16 are the same as those in the control processing in a case where the moment balance around the front wheel is calculated, thus only arithmetic processing of S12 will be described.

The arithmetic section 11 calculates an expression representing the product (M·h) of the vehicle weight M and the height h of the center of gravity on the basis of the expression of the moment balance around the rear wheel (Step S12). Specifically, the arithmetic section 11 acquires Expression (5) of the moment balance around the rear wheel. When the forward and backward acceleration is changed to $g_x{}'$ and the front shaft load becomes $F_f{}'$, similarly to Expression (5), the arithmetic section 11 acquires Expression (6) of the moment balance. Next, the arithmetic section 11 subtracts Expression (6) from Expression (5) to obtain Expression (7). The arithmetic section 11 modifies Expression (7) to obtain Expression (8) representing the product (M·h) of the vehicle weight M and the height h of the center of gravity. Thus, as shown in FIG. 4, a curve C2 is obtained which represents the product of the vehicle weight M and the height h of the center of gravity.

$$F_f \cdot L + M \cdot g_x \cdot h = M \cdot g \cdot L_r \qquad \text{Expression (5)}$$

$$F_f{}' \cdot L + M \cdot g_x{}' \cdot h = M \cdot g \cdot L_r \qquad \text{Expression (6)}$$

$$(F_f - F_f{}')L + M \cdot h(g_x - g_x{}') = 0 \qquad \text{Expression (7)}$$

$$M \cdot h = -(F_f - F_f{}')L/(g_x - g_x{}') \qquad \text{Expression (8)}$$

Next, with reference to FIGS. 2, 4, and 5, description will be provided as to control processing in a case where the vehicle weight and the height of the center of gravity of the vehicle M1 are estimated during traveling on a slope with a gradient angle θ. In this control processing, input processing of S10, range restriction processing of S14, and selection processing of S16 are the same as those in the control processing in a case where the vehicle M1 is traveling on a flat road, thus only arithmetic processing of S12 will be described. In FIG. 5, M represents the vehicle weight of the vehicle M1, h represents the height of the center G of gravity of the vehicle M1 based on the ground, L represents the wheel base of the vehicle M1, $L_f$ represents the distance between the front shaft FS of the vehicle M1 and the center G of gravity in the horizontal direction with respect to the road, and $L_r$ represents the distance between the rear shaft RS of the vehicle M1 and the center G of gravity in the horizontal direction with respect to the road. $F_f$ represents a load imposed on the front shaft FS, $F_r$ represents a load imposed on the rear shaft RS, $g_x$ represents forward and backward acceleration, and g represents gravity acceleration.

The arithmetic section 11 calculates an expression representing the product (M·h) of the vehicle weight M and the height h of the center of gravity on the basis of the expression of the moment balance around the front wheel (Step S12). Specifically, the arithmetic section 11 acquires Expression (9) of the moment balance around the front wheel and modifies Expression (9) to acquire Expression (10). When the forward and backward acceleration is changed to $g_x'$ and the rear shaft load becomes $F_r'$, similarly to Expression (9) and Expression (10), the arithmetic section 11 acquires Expression (11) and Expression (12) of the moment balance. Next, the arithmetic section 11 subtracts Expression (12) from Expression (10) to obtain Expression (13). The arithmetic section 11 modifies Expression (13) to obtain Expression (14) representing the product (M·h) of the vehicle weight M and the height h of the center of gravity. Thus, as shown in FIG. 4, a curve C3 is obtained which represents the product of the vehicle weight M and the height h of the center of gravity.

$$F_r \cdot L = M \cdot g \cdot \cos\theta \cdot L_f + (M \cdot g \cdot \sin\theta + M \cdot g_x)h \quad \text{Expression (9)}$$

$$F_r \cdot L = M \cdot g \cdot \cos\theta \cdot L_f + M \cdot h(g \cdot \sin\theta + g_x) \quad \text{Expression (10)}$$

$$F_r' \cdot L = M \cdot g \cdot \cos\theta \cdot L_f + (M \cdot g \cdot \sin\theta + M \cdot g_x')h \quad \text{Expression (11)}$$

$$Fr' \cdot L = M \cdot g \cdot \cos\theta \cdot L_f + M \cdot h(g \cdot \sin\theta + g_x') \quad \text{Expression (12)}$$

$$(F_r - F_r') L = M \cdot h (g_x - g_x') \quad \text{Expression (13)}$$

$$M \cdot h = (F_r - F_r') L / (g_x - g_x') \quad \text{Expression (14)}$$

The arithmetic section 11 may leave the term M·h·g·sinθ when subtracting Expression (12) from Expression (10) to obtain Expression (15) and may modify Expression (15) to obtain Expression (16). When the forward and backward acceleration is detected by using an acceleration sensor while the vehicle M1 is traveling on a slope, all of (g·sinθ+$g_x$) and (g·sinθ+$g_x'$) are the sensor output values. For this reason, in calculating M·h using Expression (16), the output values of the acceleration sensor may be used as they are.

$$(F_r - F_r') L = M \cdot h \{(g \cdot \sin\theta + g_x) - (g \cdot \sin\theta + g_x')\} \quad \text{Expression (15)}$$

$$M \cdot h = (F_r - F_r') L / \{(g \cdot \sin\theta + g_x) - (g \cdot \sin\theta + g_x')\} \quad \text{Expression (16)}$$

Next, with reference to FIGS. 2, 4, and 5, description will be provided as to control processing in a case where, when the gradient angle of a slope is changed from θ to θ' while the forward and backward acceleration is changed from $g_x$ to $g_x'$, the vehicle weight and the height of the center of gravity of the vehicle M1 are estimated. In this control processing, input processing of S10, range restriction processing of S14, and selection processing of S16 are the same as those in the control processing in a case where the vehicle M1 is traveling on a flat road, thus only arithmetic processing of S12 will be described.

The arithmetic section 11 calculates an expression representing the product (M·h) of the vehicle weight M and the height h of the center of gravity on the basis of the expression of the moment balance around the front wheel (Step S12). Specifically, the arithmetic section 11 acquires Expression (17) of the moment balance around the front wheel and modifies Expression (17) to acquire Expression (18). When the forward and backward acceleration is changed to $g_x'$, the rear shaft load becomes $F_r'$, and the gradient angle becomes θ', similarly to Expression (17) and Expression (18), the arithmetic section 11 acquires Expression (19) and Expression (20) of the moment balance. Next, the arithmetic section 11 subtracts Expression (20) from Expression (18) to obtain Expression (21). The arithmetic section 11 modifies Expression (21) to obtain Expression (22) representing the product (M·h) of the vehicle weight M and the height h of the center of gravity. As shown in Expression (22), it is understood that the product (M·h) is affected by changes in the road gradient.

$$F_r \cdot L \cdot M \cdot g \cdot \cos\theta \cdot L_f + (M \cdot g \cdot \sin\theta + M \cdot g_x)h \quad \text{Expression (17)}$$

$$F_r \cdot L = M \cdot g \cdot \cos\theta \cdot L_f + M \cdot h (g \cdot \sin\theta + g_x) \quad \text{Expression (18)}$$

$$F_r' \cdot L = M \cdot g \cdot \cos\theta' \cdot L_f + (M \cdot g \cdot \sin\theta' + M \cdot g_x')h \quad \text{Expression (19)}$$

$$F_r' \cdot L = M \cdot g \cdot \cos\theta'' \cdot L_f + M \cdot h(g \cdot \sin\theta' + g_x) \quad \text{Expression (20)}$$

$$(F_r - F_r')L = M \cdot g \cdot L_f (\cos\theta - \cos\theta') + M \cdot h\{(g \cdot \sin\theta + g_x) - (g \cdot \sin\theta' + g_x')\} \quad \text{Expression (21)}$$

$$M \cdot h = \{(F_r - F_r')L - M \cdot g \cdot L_f(\cos\theta - \cos\theta')\} / \{(g \cdot \sin\theta + g_x) - (g \cdot \sin\theta' + g_x')\} \quad \text{Expression (22)}$$

If the change in θ with respect to the change in $g_x$ is small to be negligible, Expression (22) becomes Expression (23) or Expression (24) and, as shown in FIG. 4, a curve C4 is obtained which represents the product of the vehicle weight M and the height h of the center of gravity. The determination whether or not the change in θ while $g_x$ is being changed is sufficiently small is made by comparing changes in forward and backward acceleration based on the wheel speed and changes in forward and backward acceleration from the output value of the forward and backward acceleration sensor. Although the forward and backward acceleration sensor is affected by an output drift at an acceleration of zero, a so-called 0-point drift, the drift is cancelled using the difference by the above-described method, such that it is not necessary to take into consideration affect of the 0-point drift.

$$M \cdot h = (F_r - F_r')L / (g_x - g_x') \quad \text{Expression (23)}$$

$$M \cdot h = (F_r - F_r')L / \{(g \cdot \sin\theta + g_x) - (g \cdot \sin\theta - g_x')\} \quad \text{Expression (24)}$$

Next, with reference to FIGS. 2, 4, and 6, description will be provided as to control processing in a case where, when the vehicle M1 is turning at lateral acceleration $g_y$, the vehicle weight and the height of the center of gravity are estimated. In this control processing, input processing of S10, range restriction processing of S14, and selection processing of S16 are same as those in the control processing of the moment balance around the front wheel when the vehicle M1 is traveling on a flat road, thus only arithmetic processing of S12 will be described. In FIG. 6, M represents the vehicle weight of the vehicle M1, hs represents the distance between a rolling center RC and the center G of gravity of the vehicle M1, φ represents a rolling angle, $g_y$ represents lateral acceleration, and g represents gravity acceleration. In this processing, hs becomes "the height of the center of gravity". In FIG. 4, the height h of the center of gravity is substituted with the height hs of the center of gravity.

The arithmetic section 11 calculates an expression representing the product (M·hs) of the vehicle weight M and the height hs of the center of gravity (Step S12). Specifically, rolling moment by an inertial force imposed on the vehicle M1 is expressed by M·$g_y$·cosφ·hs, and rolling moment by gravity due to the inclination of the vehicle M1 is expressed by M·g·sinφ·hs. Thus, if rolling rigidity is $K_\phi$, the arithmetic section 11 acquires Expression (25). If a lateral acceleration sensor serving as the lateral acceleration detection section 4 is attached to a rolling place of the vehicle M1, the detected lateral acceleration $g_{ysens}$ is represented by Expression (26). The arithmetic section 11 modifies Expression (25) to acquire Expression (27) and Expression (28). Thus, as shown in FIG. 4, a curve C5 is obtained which represents the product of the vehicle weight M and the height hs of the center of gravity.

$$K_\phi \cdot \phi = M \cdot g_y \cdot \cos\theta \cdot hs + M \cdot g \cdot \sin\phi \cdot hs \quad \text{Expression (25)}$$

$$g_{ysens} = g_y \cdot \cos\phi + g \cdot \sin\phi \quad \text{Expression (26)}$$

$$K_\phi \cdot \phi = M \cdot hs(g_y \cdot \cos\phi + g \cdot \sin\phi) \quad \text{Expression (27)}$$

$$M \cdot hs = K_\phi \cdot \phi / g_{ysens} \quad \text{Expression (28)}$$

As described above, with the vehicle control device 1 of this embodiment, the selection section 13 can select a value greater than an intermediate value $(M_1-M_2)/2$ of the vehicle weight M in the range FD restricted by the range restriction section 12 as the value of the vehicle weight M and can select a value greater than an intermediate value $(h_1+h_2)/2$ of the height of the center of gravity in the range FD as the value of the height h of the center of gravity. For example, in performing control to improve the behavior stability of the vehicle, the greater the height h of the center of gravity of the vehicle is, the stricter the conditions that are imposed. In performing control to predict fuel consumption, the greater the vehicle weight M is, the stricter that are conditions are imposed. Thus, the selection section 13 selects the values, which impose the conditions stricter than at least the intermediate values, in the range FD restricted by the range restriction section 12, improving the certainty of vehicle control. As described above, if the range restriction section 12 restricts the range FD, while the values near the actual vehicle weight and the height of the center of gravity are estimated, the values which become the strict conditions in vehicle control are selected, improving the behavior stability of the vehicle and sufficiently exhibiting the effect of vehicle control.

In the vehicle control device 1 according to the invention, the selection section 13 selects $M_2$, which is the value of the vehicle weight at the boundary position of the range FD, as the value of the vehicle weight M and selects $h_1$, which is the value of the height of the center of gravity at the boundary position of the range FD, as the value of the height of the center of gravity. As described above, the selection section 13 can select the value of the vehicle weight at the boundary position of the range FD, that is, the maximum value of the vehicle weight in the restricted range FD and can select the value of the height of the center of gravity at the boundary position of the range FD, that is, the maximum value of the height of the center of gravity in the restricted range FD. Thus, the selection section 13 can select the values which become the strictest conditions in vehicle control, further improving the certainty of vehicle control.

The invention is not limited to the above-described embodiment. For example, in the above-described embodiment, the vehicle control device 1 includes all of the acceleration detection section 3, the lateral acceleration detection section 4, the front shaft load detection section 6, the rear shaft load detection section 7, and the rolling angle detection section 8, and calculation based on the moment balance around the front wheel or the rear wheel and calculation based on the rolling angle can be both performed. Meanwhile, for example, a vehicle control device may be configured such that the vehicle weight and the height of the center of gravity are estimated through only calculation based on the moment balance around the front wheel or the rear wheel. Alternatively, a vehicle control device may be configured such that the vehicle weight and the height of the center of gravity are estimated through only calculation based on the rolling angle. In addition, a vehicle control device may be configured such that calculation based on the moment balance around either the front wheel or the rear wheel is performed.

Although in FIG. 4, a case has been described where all the curves C1 to C5 are the same curve, the curves may differ depending on acceleration, load, lateral acceleration, and rolling angle.

Industrial Applicability

The invention can be used in estimating vehicle weight and height of the center of gravity and performing vehicle control.

Reference Signs List

1: vehicle control device, 11: arithmetic section (arithmetic unit), 12: range restriction section (range restriction unit), 13: selection section (selection unit), M1: vehicle, M: vehicle weight, h, hs: the height of the center of gravity, C1, C2, C3, C4, C5: curve, FD: range.

The invention claimed is:

1. A vehicle control device comprising:
    a processor; and
    a memory, the memory storing instructions that when executed cause the processor to perform as:
    an arithmetic unit which calculates a curve representing a product of a vehicle weight and a height of a center of gravity of a vehicle on the basis of behavior of the vehicle;
    a range restriction unit which superimposes the curve on a line representing a relationship between the vehicle weight and the height of the center of gravity set in advance for the vehicle to restrict the range of the vehicle weight and the height of the center of gravity; and
    a selection unit which selects the value of the vehicle weight and the value of the height of the center of gravity from the range restricted by the range restriction unit, wherein
        the selection unit selects a value greater than an intermediate value of the vehicle weight in the range as the value of the vehicle weight and selects a value greater than an intermediate value of the height of the center of gravity in the range as the value of the height of the center of gravity.

2. The vehicle control device according to claim 1, wherein the selection unit selects the value of the vehicle weight at a boundary position of the range as the value of the vehicle weight and selects the value of the height of the center of gravity at a boundary position of the range as the value of the height of the center of gravity.

* * * * *